United States Patent [19]

Korb

[11] Patent Number: 5,690,056
[45] Date of Patent: Nov. 25, 1997

[54] SQUIRREL PROOF BIRD FEEDER

[76] Inventor: Thomas K.E. Korb, 3935 Donley, Rochester Hills, Mich. 48309

[21] Appl. No.: 693,993

[22] Filed: Aug. 8, 1996

[51] Int. Cl.$^6$ ................................................ A01K 39/01
[52] U.S. Cl. ........................................ 119/52.3; 119/57.9
[58] Field of Search .......................... 119/52.3, 52.2, 119/52.4, 57.8, 57.9, 59, 63

[56] References Cited

U.S. PATENT DOCUMENTS

| | | | |
|---|---|---|---|
| 2,987,041 | 6/1961 | Bard | 119/52.2 X |
| 3,083,687 | 4/1963 | Slaven | 119/52.2 |
| 4,019,462 | 4/1977 | Palfalvy | 119/57.8 X |
| 4,246,869 | 1/1981 | Tobin, Jr. | 119/57.8 |
| 5,195,459 | 3/1993 | Ancketill | 119/57.9 |
| 5,289,796 | 3/1994 | Armstrong | 119/52.3 |
| 5,291,855 | 3/1994 | Laverty | 119/52.3 |

Primary Examiner—Gene Mancene
Assistant Examiner—Yvonne R. Abbott
Attorney, Agent, or Firm—Alex Rhodes

[57] ABSTRACT

A squirrel proof bird feeder having a cable for suspending the bird feeder from a tree, an open circular upper platform, an annular feeder suspended from the platform and a trap above a free lower end portion of the cable between the platform and the feeder. The open circular platform and cable passing through the platform mislead squirrels into believing that they can descend on the cable through the platform onto the trap and descend from the trap to reach the feeder. When a squirrel contacts the trap, one or more of the resiliently mounted segments rotates to eject the squirrel either off of the periphery or through the center of the trap. The feeder has an annular portion for storing birdseed and a lower open tray portion for feeding a portion of the birdseed to birds. The lower tray is automatically replenished by birdseed which is stored in the annular portion of the feeder.

15 Claims, 5 Drawing Sheets

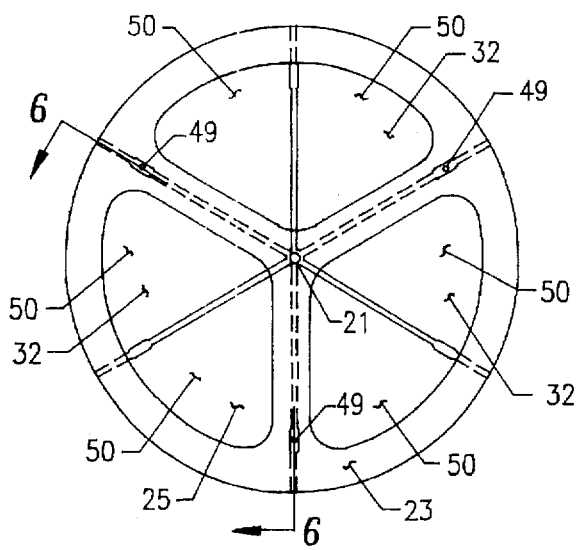
FIG. 2
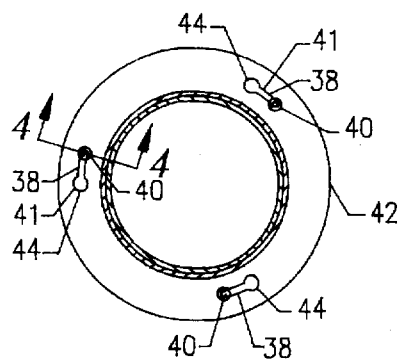
FIG. 3
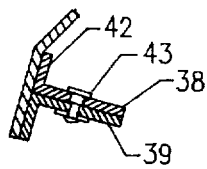
FIG. 4
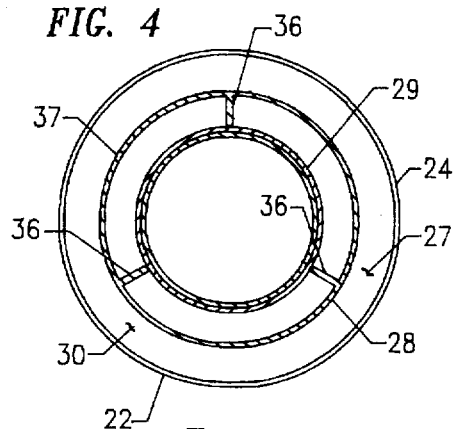
FIG. 5
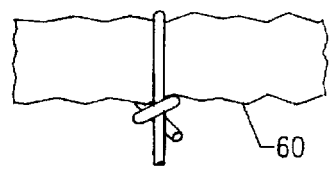
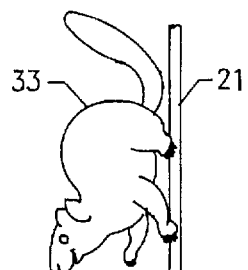
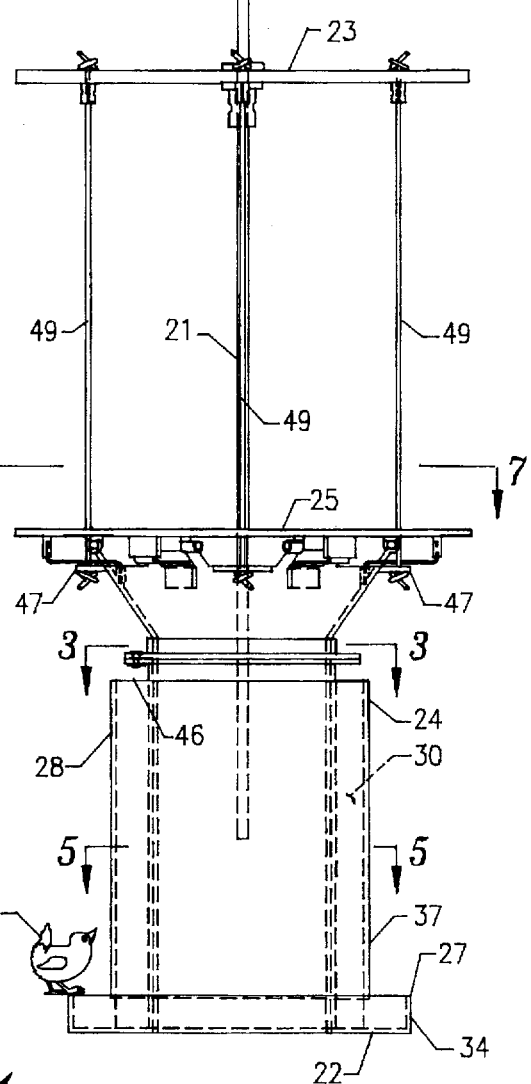
FIG. 1

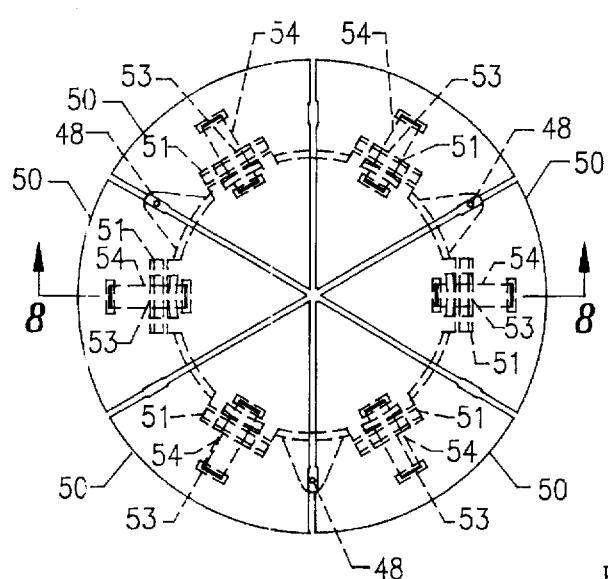
FIG. 7
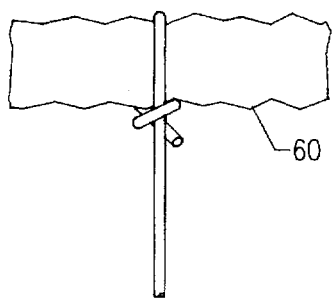
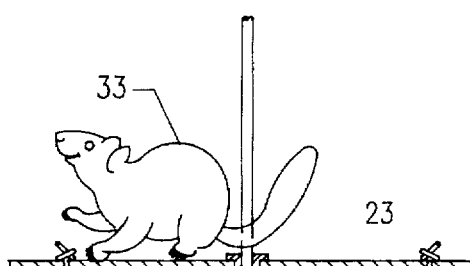
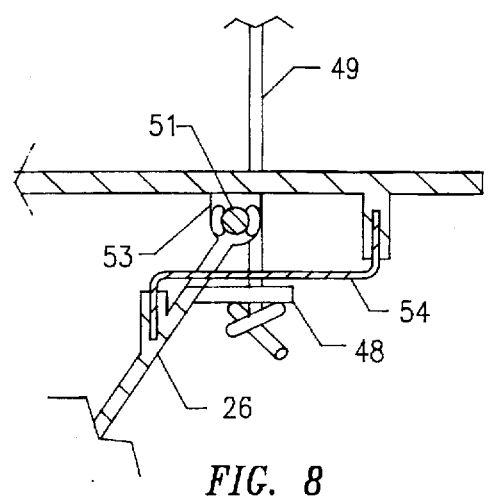
FIG. 8
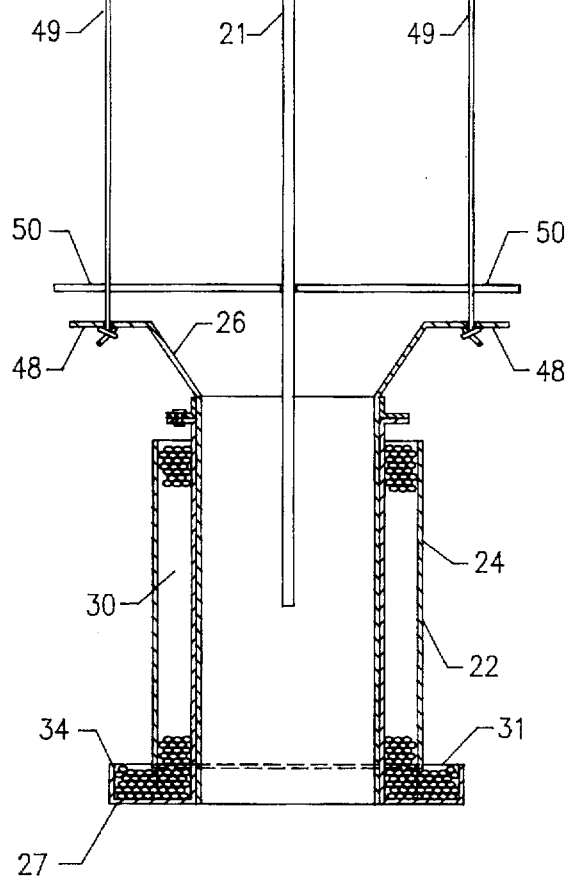
FIG. 6

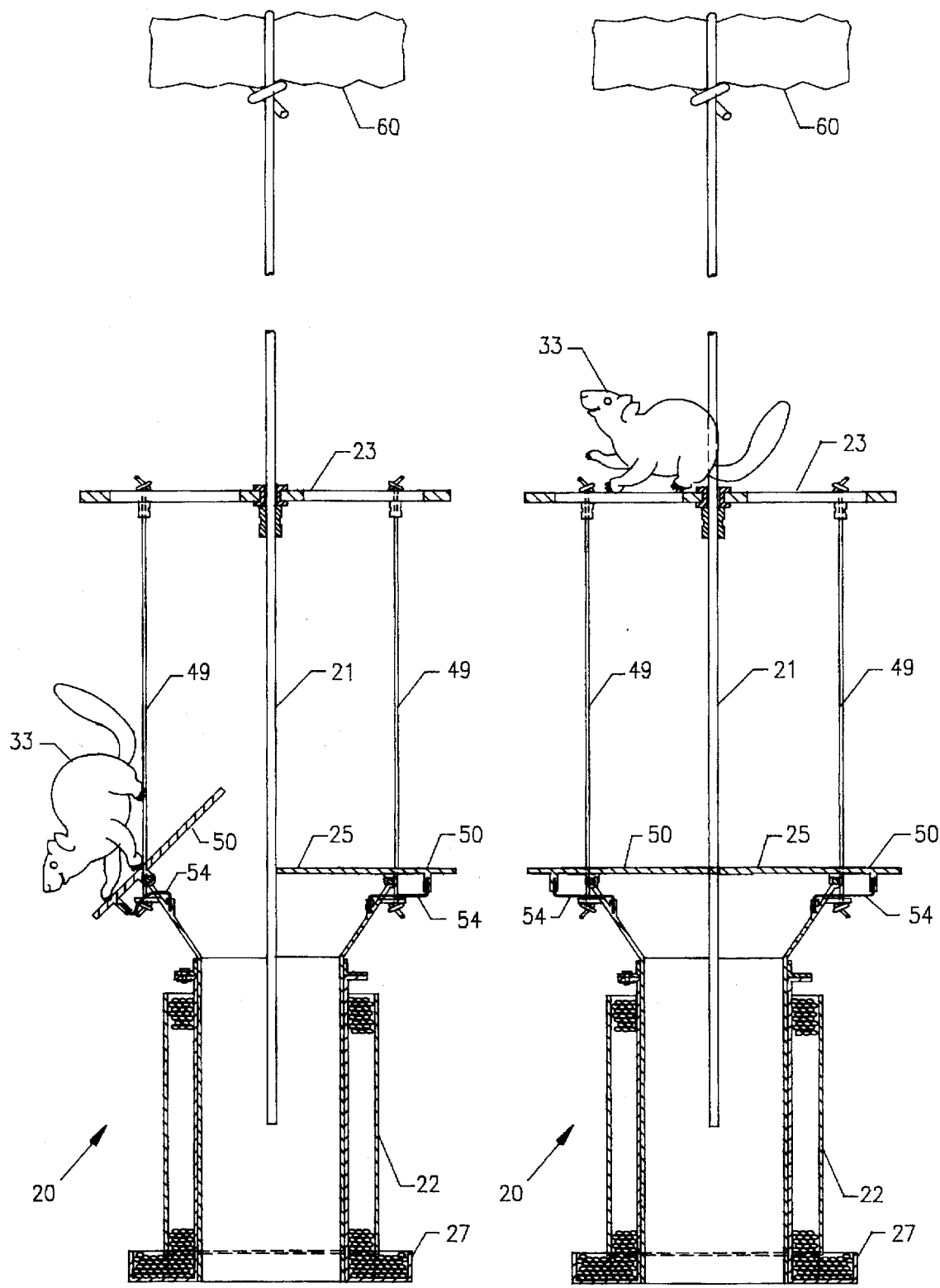

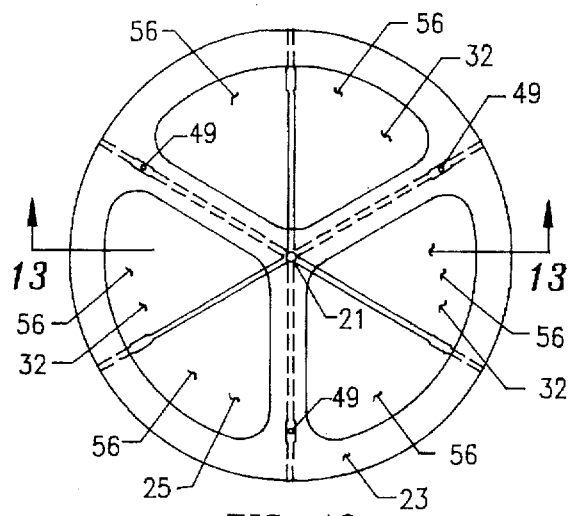
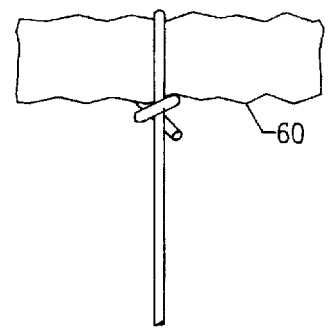
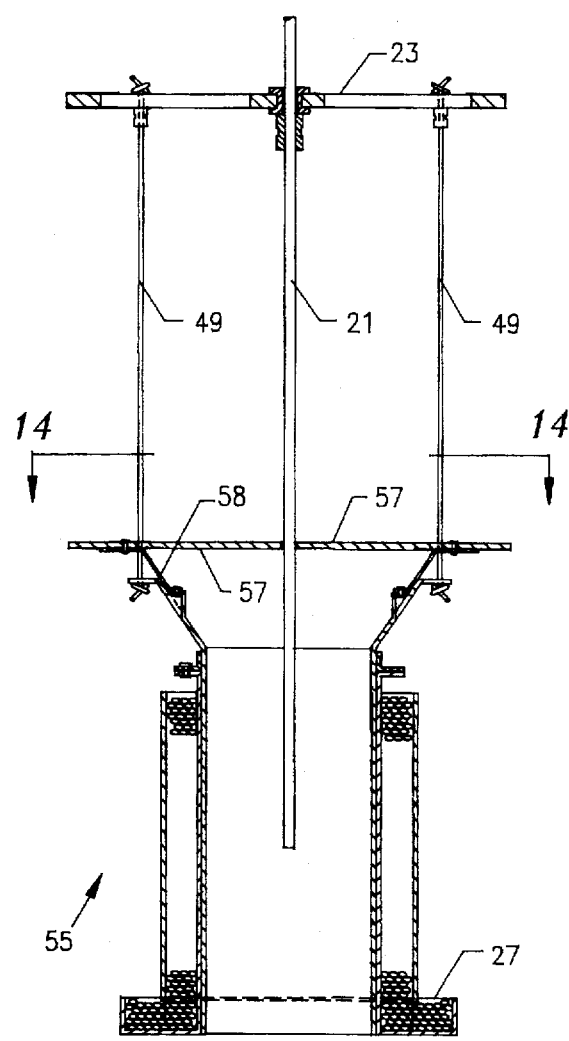
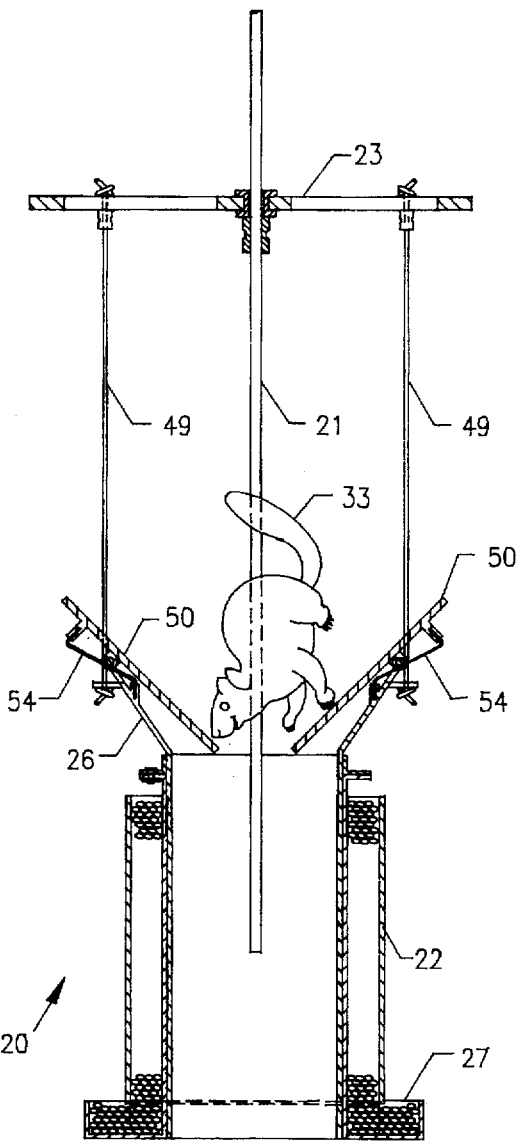
FIG. 12
FIG. 13
FIG. 11

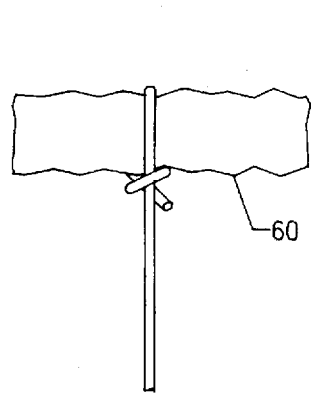
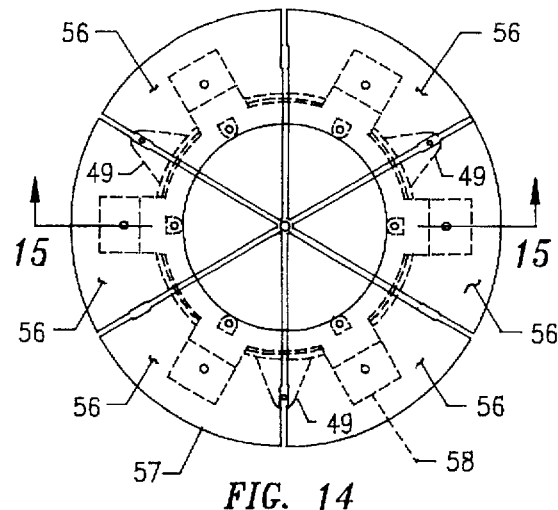
FIG. 14
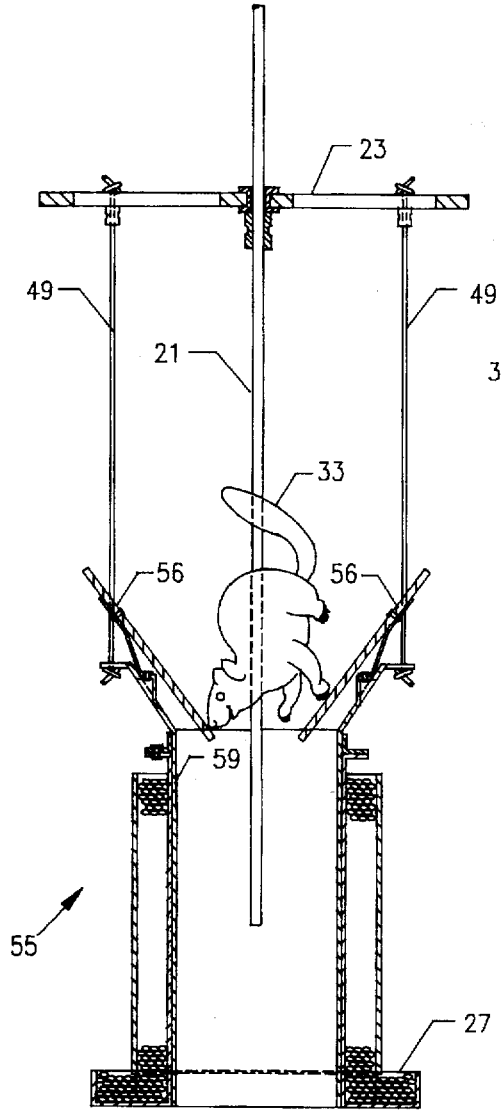
FIG. 16
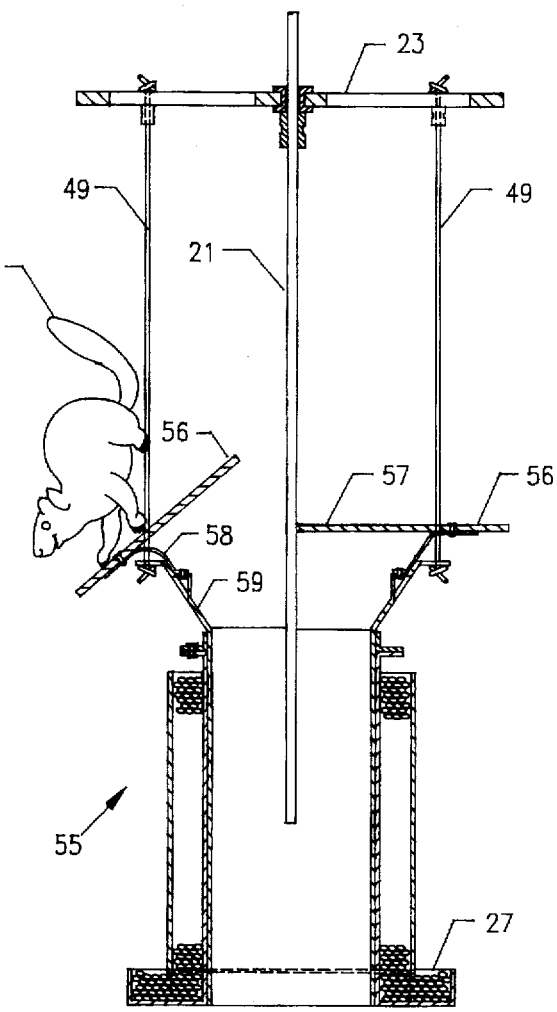
FIG. 15

# SQUIRREL PROOF BIRD FEEDER

FIELD OF THE INVENTION

This invention relates to bird feeders and more particularly to a squirrel proof bird feeder.

BACKGROUND OF THE INVENTION

Numerous feeders exist in the art for preventing theft by squirrels. Squirrels, the dreaded enemy of birds, are mainly vegetarians who compete with birds for similar foods including birdseed. They have insatiable appetites and constantly forage for food. One available source (of food) is feeders that are maintained for wild birds. The feeders are generally suspended on cables which are attached to branches of trees. Squirrels, being excellent climbers, descend the cables on to the bird feeders.

Since birds do not store food, in many cases they would not survive without food in the feeders. Despite the efforts to prevent theft from feeders, theft by squirrels is a significant problem. The cunning and agility of squirrels have enabled them to circumvent the most ingenious in the prior art.

SUMMARY OF THE INVENTION

A primary object of the present invention is to provide a squirrel proof, tamper proof bird feeder which is immune to attacks by squirrels and other similar animals. Another object is to provide a bird feeder having a large capacity for storing food.

The bird feeder is broadly comprised of a platform, an annular feeder suspended from the platform by three cables and a trap between the upper platform and the feeder. The bottom portion of the feeder is a perch and a housing which is automatically replenished from an annular storage area as the feed is consumed by a bird.

The trap, which is an important feature of the invention, consists of a plurality of tiltable segments and is similar in appearance to the support platform. The tiltable segments are resiliently attached to an upper portion of the feeder. The principal of the feeder is to induce a squirrel to enter the trap. In such event, the segments tilt and eject the squirrel off the edges of the trap or through the trap and the center of the annular feeder.

In a first aspect of the invention, the tiltable segments are resiliently attached to the feeder by thin leaf springs. In a second aspect of the invention, the tiltable segments are resiliently attached to the feeder by a flexible plastic member.

Further objects, benefits and features of the invention will become apparent from the detailed description that follows and drawings that disclose the invention. The property in which exclusive rights are claimed is set forth in each of the numbered claims at the conclusion of the detailed description.

BRIEF DESCRIPTION OF THE DRAWINGS

FIG. 1 is a side elevational view of a squirrel proof bird feeder according to the invention.

FIG. 2 is a plan view of the bird feeder.

FIG. 3 is a cross-sectional view taken on the line 3—3 in FIG. 1.

FIG. 4 is a cross-sectional view taken on the line 4—4 in FIG. 3.

FIG. 5 is a cross-sectional view taken on the line 5—5 in FIG. 1.

FIG. 6 is a cross-sectional view taken on the line 6—6 in FIG. 2.

FIG. 7 is a cross-sectional view taken on the line 7—7 in FIG. 1.

FIG. 8 is a partial cross-sectional view drawn to an enlarged scale taken on the line 8—8 in FIG. 7.

FIG. 9 is a full cross-sectional view taken in the same manner as FIG. 8.

FIG. 10 is a cross-sectional view taken in the same manner as FIG. 9 except for a tipping of a segment of a trap of the bird feeder.

FIG. 11 is a cross-sectional view taken in the same manner as FIG. 9 except for a tipping of a pair of segments of the trap door of the bird feeder.

FIG. 12 is a plan view of an alternate embodiment of the invention.

FIG. 13 is a cross-sectional view taken on the line 13—13 in FIG. 12.

FIG. 14 is a cross-sectional view taken on the line 14—14 in FIG. 13.

FIG. 15 is a cross-sectional view taken in the same manner as FIG. 14 except for a tilting of a segment of a trap of the bird feeder.

FIG. 16 is a cross-sectional view taken in the same manner as FIG. 14 except for a tilting of a pair of segments of the trap of the bird feeder.

DESCRIPTION OF THE PREFERRED EMBODIMENT

Referring now to the drawings wherein the same numerals designate similar and corresponding parts throughout the several views, a squirrel proof bird feeder 20 is depicted in FIGS. 1 through 10, inclusive, according to the invention. The bird feeder 20 is a generally cylindrical device comprised of a cable 21 for suspending the bird feeder 20 from an object such as a branch 60 of a tree; a circular upper platform 23; an annular feeder 22 suspended from the upper platform; and a circular trap 25 between the upper platform 23 and the feeder housing 24. The feeder 22 is comprised of a cylindrical support member 26 suspended from the platform 23 and a removable feeder housing 24 attached to the support member 26. The platform 23 has a plurality of openings 32 to allow a squirrel 33 to readily descend on the cable 21 through the platform 23. The cable 21 is preferably coated with a low friction material to prevent a squirrel from securely anchoring himself to the cable 21.

The feeder housing 24 is an annular structure comprised of an inner tubular member 29 and an outer tubular member 28. An annular space 30 between the outer 28 and inner 29 members forms a compartment for storing birdseed 31. A lower portion of the inner member 29 is open and extends outward a small distance to provide a feeder tray 27 with access to birdseed 31. The span between the open feeder tray 27 and the top of the feeder housing 24 is preferably great enough to prevent squirrels 33 from hanging downwardly from the top portion of the feeder housing 24 and reaching the birdseed 31 in the open feeder tray 27. The outer portion of the feeder tray 27 is turned up to provide a perch 34 for birds 35.

With reference to FIGS. 5 and 6, the feeder housing outer member 28 is located on the inner member 29 by three ribs 36 which extend inwardly from the outer member 28. The ribs 36 extend a short distance below a cylindrical wall 37 for birdseed 31 to flow from the annular storage space 30 into the open feeder tray 27.

The feeder housing 24 is retained to the tubular support member 26 by a twist lock 38. The twist lock 38 is best understood by reference to FIGS. 3 and 4. At the upper end of the feeder housing's inner member 29 is an outward extending flange 39. Three equally spaced shoulder rivets 40 are attached to the flange 39 and engage keyslots 41 in a collar 42 which is attached to the feeder housing's inner member 29. The feeder housing 24 is attached to the support member 26 by engaging the heads 43 of the rivets 40 with enlarged portions 44 of keyslots 41 in the flange 39 and rotating the feeder housing 24.

The feeder housing 24 is filled with birdseed 31 by removing the feeder housing 24 from the support member 26 and filling the housing 24 through an annular opening 46 in the upper portion of the feeder housing 24. With reference to FIGS. 6 and 7, on the support member 26 are three outwardly extending tabs 47. Each tab 47 has an aperture 48 which receives an end portion of a cable 49 which extends upwardly to an attachment with the upper platform 23.

The trap 25 is best understood by reference to FIGS. 7 and 8. The trap 25 is divided into six horizontal pie-shaped segments 50. Each segment 50 is attached to the support member 26 by a pin 51 which engages a pair of arms 56 that extend upwardly from the support member 26 and an arm 53 that extends downwardly from the segment 50. The segment 50 is maintained in a free horizontal position by a thin leaf spring 51. One end of the spring 51 is anchored to the segment 50 and the other end of the segment is anchored to the support member 26.

Referring now to FIG. 1, the cable 21 which supports the bird feeder 20 provides a squirrel 33 with a path to the bird feeder 20. When a squirrel 33 descends to the platform 23, three options are available to the squirrel 33. Under the first option which is the most likely option the squirrel 33 will exercise, the squirrel 33 descends downwardly along the cable 21 through one of the openings 32 in the platform. When the squirrel reaches the trap 25, the inner portions of the segments 50 tilt downwardly and the squirrel is ejected as shown in FIG. 11 through the open center of the feeder housing 24. Under the second option, the squirrel 33 moves outwardly and descends downwardly along one of the three cables 49 to the trap 25. As shown in FIG. 10, upon contacting the trap 25, the segments 50 of the trap 25 tilt downwardly, ejecting the squirrel 33 from the periphery of the trap 25.

Under the third option, the squirrel 33 moves outwardly, descends a small distance along one of the three cables 49 which attach to the support member 26, swings inwardly to the center cable 21, and descends downwardly along the center cable 21 to the trap 25. As shown in FIG. 11, upon reaching the trap 25, the segments 50 of the trap 25 tilt downwardly, ejecting the squirrel 33 through the center of the feeder 20. It should be observed that the lower portion of the cable 21 extends below the trap 25. This is intentionally done to prevent the squirrel 33 from taking corrective action before plunging through the trap 25. After the squirrel 33 passes through the trap 25, the resilient leaf springs 54 return the segments 50 to their free horizontal positions.

In FIGS. 12 through 16, inclusive, an alternate embodiment 55 is shown wherein the segments 56 of a trap 57 are attached to a thin resilient plastic member 58 which positions the segments 56 horizontally. The lower portion of the resilient member 58 is attached to a tubular support member 59. As shown in FIGS. 15 and 16, in a similar manner as the first embodiment 20, squirrels 33 are ejected from a peripheral portion of the trap 57 or through the center of the trap 57.

From the foregoing it will be appreciated that my invention provides an effective means for preventing squirrels and other similar animals from stealing birdseed from a feeder.

Although only two embodiments have been illustrated and described, it is not my intention to limit my invention to these embodiments since other embodiments can be developed by such changes as material, shape and arrangement of parts, and substitution of elements without departing from the spirit thereof.

I claim:

1. A bird feeder comprising: a cable for suspending said bird feeder from an object such as a tree, said cable defining a vertical axis; a platform attached at a center portion thereof to said cable; an annular feeder suspended from a peripheral portion of said platform; a plurality of cables for suspending said feeder from said platform, each of said cables spaced an equal distance from said axis and having an upper portion attached to said peripheral portion and a lower portion attached to a peripheral portion of said feeder; and a trap located below said platform, said trap having a plurality of radial segments mounted thereon, and adapted to tilt, and a means for resiliently mounting each of said segments to said feeder.

2. The bird feeder recited in claim 1 wherein said feeder has an annular portion for storing birdseed and an open lower tray portion.

3. The bird feeder recited in claim 2 further comprising said feeder having a support member having said peripheral portion for suspending said feeder from said platform and a removable member attached to said support member, said removable member having said annular portion and said tray portion.

4. A bird feeder comprising: a platform; a feeder suspended from a peripheral portion of said platform; and a trap located below said platform, said trap having a plurality of radial segments mounted thereon, and adapted to tilt, and a means for resiliently mounting each of said segments to said feeder.

5. The bird feeder recited in claim 4 further comprising a cable attached to a center portion of said platform for suspending said feeder from an object such as a tree.

6. The bird feeder recited in claim 4 wherein said cable extends downwardly from an attachment to said platform to a lower end portion below said trap.

7. The bird feeder recited in claim 4 wherein said platform has a plurality of openings.

8. The bird feeder recited in claim 4 wherein said means for resiliently mounting each of said segments of said trap comprises a flexible plastic member attached to said feeder.

9. The bird feeder recited in claim 4 wherein said feeder is suspended from said platform by a plurality of cables, each of said cables having an upper end portion attached to said peripheral portion of said platform and a lower end portion attached to a peripheral portion of said feeder.

10. The bird feeder recited in claim 4 wherein said feeder is comprised of a cylindrical support member suspended from said platform; a feeder housing removably attached to said support member, said feeder housing having an annular portion for storing birdseed and an open lower feeder tray portion; and a means for removably attaching said feeder housing to said support member.

11. The bird feeder recited in claim 10 wherein said feeder tray has an outer upward extending flange for providing a perch for a bird.

12. The bird feeder recited in claim 10 wherein said means for removably attaching said feeder housing to said support member is comprised of a plurality of members extending upwardly from attachments to said feeder housing and a plurality of keyslots in said support members for engaging said upwardly extending members, said upwardly extending members being rotatable in said keyslots for attaching and releasing said feeder housing.

13. A bird feeder comprising: a cable, said cable having an upper end portion for attaching said bird feeder to an object such as a tree, an intermediate portion for attaching said bird feeder to said cable and a free lower end portion; a circular platform having a center portion attached to said intermediate portion of said cable and a plurality of openings for permitting an animal such as a squirrel to pass through said platform; an annular feeder suspended from a peripheral portion of said platform, said feeder having an annular portion for storing birdseed and an open lower end tray portion for feeding a portion of said birdseed to birds; a plurality of cables for suspending said feeder from said platform, each of said cables having an upper end portion for attaching said cable to said peripheral portion of said platform and a lower end portion for attaching said cable to a peripheral portion of said feeder; a circular trap positioned below said platform, said platform having a plurality of radial segments mounted thereon, and adapted to tilt; and a means for resiliently mounting each of said segments for rotation on said feeder.

14. The bird feeder recited in claim 13 wherein said trap is located above said free lower end portion of said cable which is attached to said platform.

15. The bird feeder recited in claim 13 wherein said cable which attaches said bird feeder to said tree is coated with a low friction material.

* * * * *